United States Patent [19]

Doane

[11] 4,026,401

[45] May 31, 1977

[54] CIRCUITRY FOR GENERATING A PLURALITY OF INDEPENDENT INK PRINT CONTROL SIGNALS

[75] Inventor: Ivan G. Doane, North Tonawanda, N.Y.

[73] Assignee: Moore Business Forms, Inc., Niagara Falls, N.Y.

[22] Filed: Aug. 18, 1976

[21] Appl. No.: 715,574

Related U.S. Application Data

[63] Continuation of Ser. No. 622,432, Oct. 14, 1975, abandoned.

[52] U.S. Cl. .................. 197/1 R; 346/75; 340/172.5

[51] Int. Cl.² .................. G01D 15/18

[58] Field of Search .............. 197/1 R; 346/1 R, 75; 101/426, 1 R; 340/172.5

[56] References Cited

UNITED STATES PATENTS

| | | | |
|---|---|---|---|
| 3,911,818 | 10/1975 | MacIlvaine | 101/426 |
| 3,913,719 | 10/1975 | Frey | 197/1 R |
| 3,925,787 | 12/1975 | Suzuki | 346/75 |
| 3,925,789 | 12/1975 | Kashio | 346/75 |
| 3,972,052 | 7/1976 | Atumi et al. | 197/1 R X |
| 3,990,559 | 11/1976 | Martin et al. | 340/172.5 X |

FOREIGN PATENTS OR APPLICATIONS

| | | | |
|---|---|---|---|
| 2,501,793 | 1/1975 | Germany | 197/1 R |

OTHER PUBLICATIONS

IBM Tech. Discl. Bull., vol. 12, No. 12, May 1970, pp. 2202–2204, "Non-Impact Printer Logical Design".
IBM Tech. Discl. Bull., vol. 14, No. 9, Feb. 1972, p. 2796, "Variable Delay for Ink Jet Printer".

*Primary Examiner*—E. H. Eickholt
*Attorney, Agent, or Firm*—Watson Cole Grindle & Watson

[57] ABSTRACT

Variable alpha/numeric data is printed by a plurality of ink jets and registered in aligned relationship with fixed data printed on a moving web in response to a first time dependent signal representative of the position of the alpha/numeric data. A plurality of successive secondary time dependent signals are produced by delay means responsive to the first time dependent signals for controlling a plurality of controller means each responsive to a respective one of the secondary time dependent signals for independently generating print control signals, and at least one of the controller means is responsive to the first time dependent signal. The plurality of ink jets is controlled by means responsive to the plurality of print signals. The first time dependent signal may also be representative of the speed of the moving web.

8 Claims, 6 Drawing Figures

CIRCUITRY FOR GENERATING A PLURALITY OF INDEPENDENT INK PRINT CONTROL SIGNALS

This is a continuation of application Ser. No. 622,432, filed Oct. 14, 1975 and now abandoned.

This invention relates to timing apparatus and more specifically to such apparatus for generating timing signals utilized in controlling the droplet release form ink jet nozzles in non-impact printing devices. More specifically, the present invention is a modification of the structure disclosed in U.S. Pat. application Ser. No. 394,208, filed on Sept. 4, 1973, issued Oct. 14, 1975 as U.S. Pat. No. 3,911,818, and assigned to the same Assignee as the present invention, and in particular represents a modification of the interface head controller circuitry illustrated in FIG. 8 of the aforementioned patent, and the manner in which such circuitry is controlled.

BACKGROUND OF THE INVENTION

In the non-impact printing system described in the aforementioned U.S. Patent, the five nozzles in each print head were physically staggered apart along the direction of web travel. Such staggering of the individual nozzles in each of the print heads were required because of the physical size of the nozzle assemblies. The circuitry illustrated in FIG. 8 and the accompanying description as set forth in the aforementioned patent provided in necessary compensation for the separation of the individual nozzles within a print head such that variable data could be printed in a five line message format in a desired depth form. Thus, the interface head controller circuitry which controlled nozzles 2, 3, 4 and 5 in each print head in the system described in the aforementioned patent, could not be readily independently aligned. Additionally, each of interface head controllers 2, 3, 4 and 5 in each print head as described in the patent was incapable of generating the necessary printing control signals (STR 1 and STR 2 printing signals) until the master head controller and interface head controllers 2, 3 and 4, respectively, had completed the generation of their respective printing signals. This resulted in an unnecessarily lengthy minimum form length in which the variable data could be printed by the nozzles associated with the master head controller and the interface head controllers 2, 3, 4 and 5 in each print head.

SUMMARY OF THE INVENTION

The structure in accordance with the present invention simplifies the line message alignment of the variable data that can be printed, reduces the minimum form length on which such a message can be printed, and increases the versatility of non-impact printing system by providing more independent control of the nozzles within each of the print heads. In the present circuitry and independently operable count-down circuit is provided in each interface head controller. The master head controller is controlled by the corrected top of form (CTOF) pulse generated by the circuitry illustrated in FIGS. 5A and 5B of the aforementioned patent. However, each of the four interfaced head controller circuits generates a CTOF pulse, namely, CTOF 2, 3, 4 and 5. These CTOF pulses replace the ASTR 1 pulses of the patent, which pulses used to initiate operation of the interface head controllers as described with respect of FIG. 8.

Also, in the head control circuitry of the present invention, the counters associated with the interface head controllers do not directly count the clock pulses (CP) but count the clock pulses divided by two (CP/2), thereby enabling the use of a two stage counter and saving a counter stage in each of the interface head controller circuits.

OBJECTS OF THE INVENTION

It is a primary object of the present invention to provide improved circuitry for controlling the release of ink droplets from a plurality of successively staggered ink jet nozzles in a printing head unit for non-impact printing systems.

It is a further object of the present invention to provide improved timing control circuitry of the release of an ink droplet from apparatus as described herein in which the minimum length of the form that can be printed with variable information is optimized.

It is yet a further object of the present invention to provide timing control circuitry of the type specified herein which is less complex and more versatile than previously known timing control circuitry.

BRIEF DESCRIPTION OF THE FIGURES

The above features and objects will be readily apparent from the following description taken in conjunction with the accompanying drawings, wherein.

DETAILED DESCRIPTION

Figure 1:
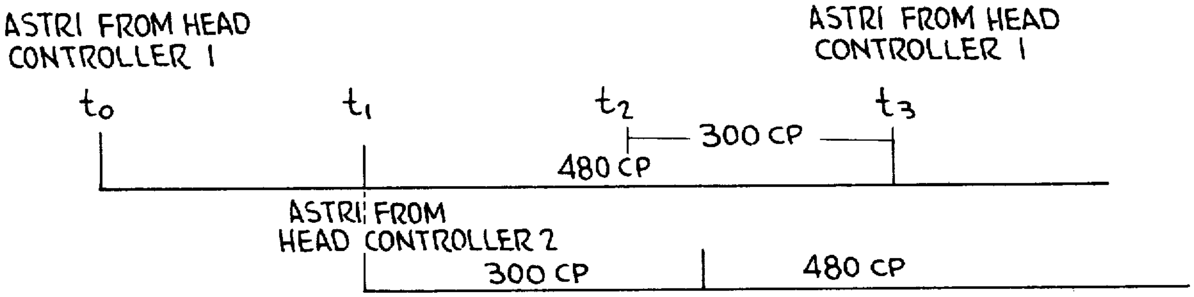
FIG. 1 is a timing diagram indicating the timing of the ASTR 1 pulses for two head controllers associated with two adjacent nozzles in a print head of the above mentioned patent.

As illustrated in FIG. 1, the timing of the ASTR 1 control pulses from any two interface head controllers (head controllers) associated with two adjacent nozzles in a print head of the above mentioned patent was such as to provide a minimum form length of six and one-half inches. Assuming head controller 2 receives its ASTR 1 signal from head controller 1 at a time $t_0$, the ASTR 1 pulse for head controller 3 will be generated after 300 CP pulses, representing the 2½ inch illustrative stagger between adjacent nozzles. At time $t_1$, head controller 2 begins generating the STR 1 and STR 2 pulses, described in the patent, for controlling the actual printing of the alpha/numeric characters and head controller 3 begins counting down 300 CP pulses to account for the 2½ inch stagger. Assuming a message length of forty characters, a message length of 4 inches or 480 CP pulses (where the clock pulses are 120 pulses per inch as described in the aforementioned patent) results in 10 characters per inch. Theoretically, the next ASTR pulse from head controller 1 could occur at time $t_2$ since at time $t_3$ (300 CP pulses later) it would have completed its forty character message and would be ready to begin another print cycle. However, in the system of the aforementioned patent, the ASTR 1 pulses are used as reference pulses to initialize counters and flip-flops in the head controller circuitry. Thus, the ASTR 1 pulses must not occur while the STR 1 and STR 2 pulses are being generated from each of the head controllers. Therefore, the next time that the ASTR 1 pulse from head controller 1 may occur is at time $t_3$. The minimum length of the form is thus represented by the distance between one ASTR 1 pulse to the next ASTR 1 pulse which, as illustrated in FIG. 1, is 300 plus 480 or 780 CP pulses, which equals 6½ inches at 120 clock pulses per inch.

In the present invention all of the head controllers use the circuitry of the master head controller of FIG. 7 of the patent, which circuitry includes an independently operable count-down circuit for the heading distance in a given message line. In comparison with the aforedescribed example of the timing in the patented system, the provision of an independent count-down circuit within each one of the head controllers effectively enables the second ASTR 1 pulse to be generated at time $t_2$ rather than at time $t_3$. Thus in the present system the STR 1 and STR 2 pulses from each of the head controller circuits can be generated beginning at time $t_2$. In the present invention, the ASTR 1 pulses of the above patent are referred to as CTOF pulses.

Figure 2:
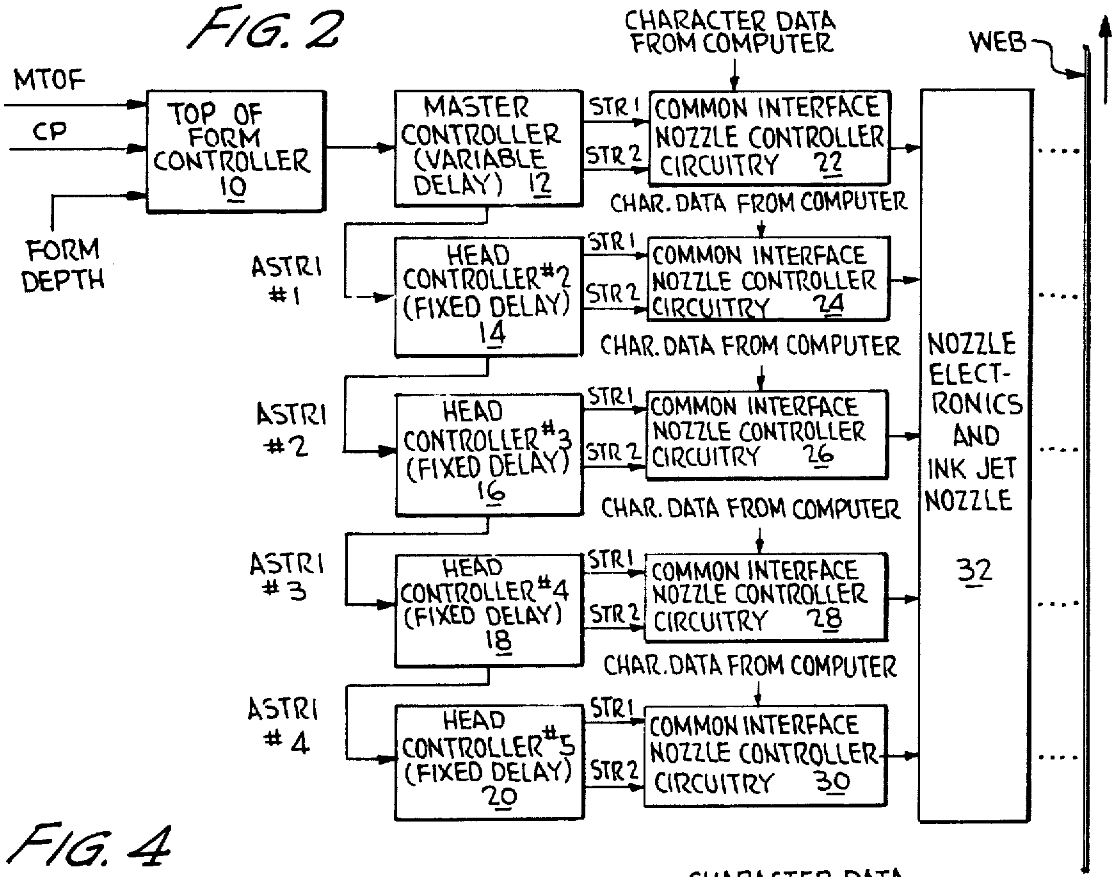
FIG. 2 is a block diagram representation of the master head controller and head controller circuitry as disclosed in the aforementioned patent, and including a block diagram representation of the common interface nozzle controller circuitry, the nozzle electronics and ink jet nozzles of the patent.
Figure 3:
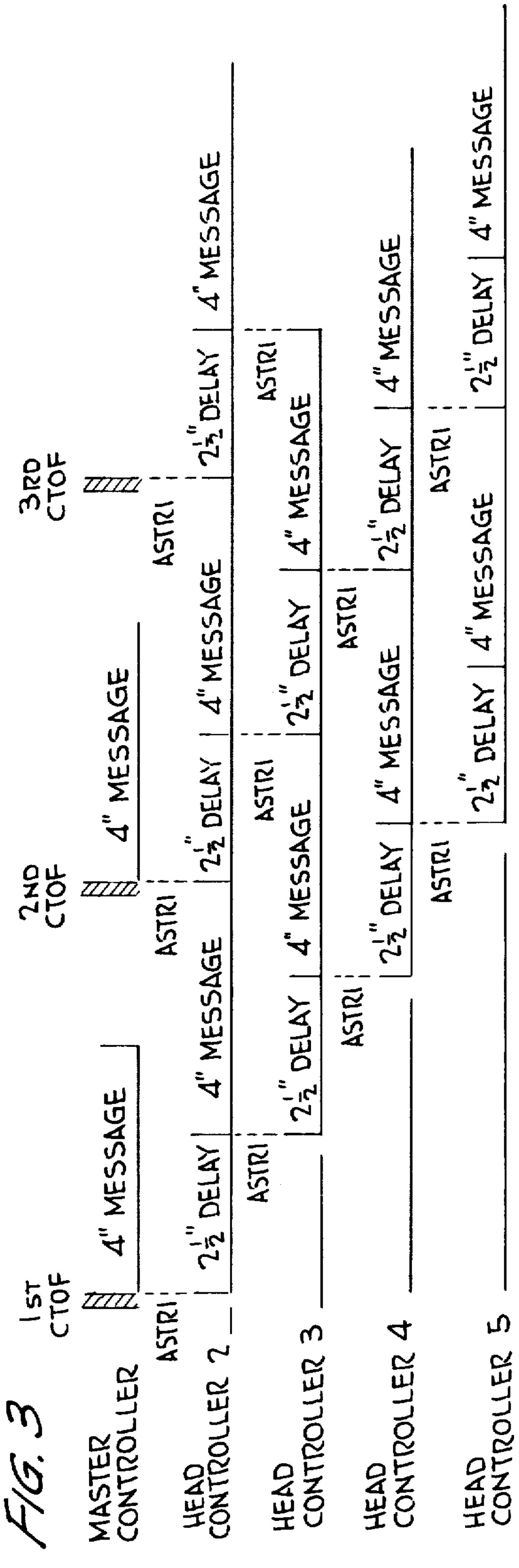
FIG. 3 is a timing diagram showing the relationship between the timing signals generated by the circuitry of FIG. 2.

Top of form circuit 10 in FIG. 2 corresponds to that circuitry which is illustrated in FIGS. 5A and 5B of the aforementioned patent. As described therein, top of form circuit 10 is responsive to a mechanical top of form pulse, clock pulses (CP pulses), which are generated in dependence on the speed of the moving web on which the variable data information is to be printed by the ink jet nozzles, and the form depth that is selectable by the operator of the system. Top of form circuit 10 generates a CTOF pulse, which is dependent on the speed of the moving web and the form depth, and that signal is used by master head controller circuit 12 (FIG. 7 and the accompanying description of the patent) to generate the necessary printing timing signals STR 1 and STR 2 which control the release of ink droplets from the first ink jet nozzle of the five ink jet nozzles in a print unit. Master head controller 12 also generates an ASTR 1 pulse which is used to initiate operation of head controller 14 (FIG. 8 and the accompanying description of the patent). Head controller 14 in turn generates STR 1 and STR 2 ink jet timing pulses for controlling the ink droplet release from the second ink jet nozzle in a print head. In similar fashion, head controllers 16, 18 and 20 also generate the necessary STR 1 and STR 2 pulses which are used to control the ink droplet release from respective associated ink jet nozzles. As set forth in the description of the aforementioned patent, each of head controllers 14, 16 and 18 provides an ASTR 1 pulse which is used to control a successive head controller and which pulse is delayed by a fixed amount, namely, the interval between each ink jet nozzle within a print head unit. The timing for minimum form length is shown in FIG. 3, wherein the shaded portions in the timing of the master head controller represent variable time delay to obtain variable heading distance.

Common interface nozzle controller circuitry 22, 24, 26, 28 and 30 are block representations of the circuitry shown in FIGS. 9 and 10 of the patent. Nozzle electronics and ink jet nozzle circuit 32 correspond to that which is shown in FIG. 15 of the patent.

Figure 4:
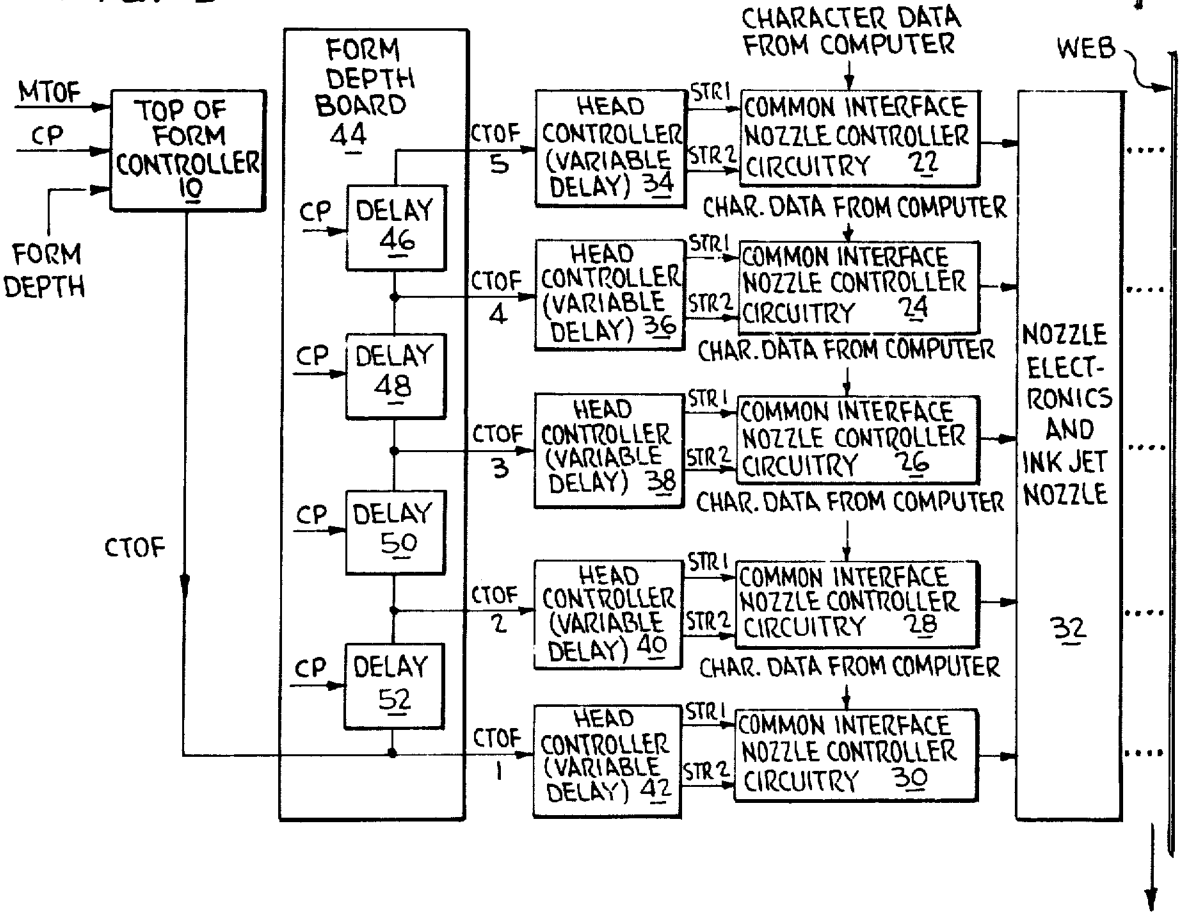
FIG. 4 is a block diagram representation of the modified circuitry in accordance with the present invention and including a block diagram representation of the common interface nozzle controller circuitry, the nozzle electronics and ink jet nozzles of the patent.

A block diagram representation of the improved interface controller circuitry of the present invention is illustrated in FIG. 4 wherein top of form controller 10, the common interface nozzle controller circuitry, and the nozzle electronics and ink jet nozzle circuitry are identical to that illustrated in FIG. 2. Head controllers 34, 36, 38, 40 and 42 are identical circuits and each comprise the master head controller circuit shown in FIG. 7 of the patent. This represents another advantage of the present system over that described in the patent in that an economy is achieved by the use of only one typical head controller circuit. As illustrated is FIG. 4, a variable delay is incorporated in each of head controllers 34–42, thereby enabling a more flexible variation in the alignment of the message than in the system described in the patent in which the head controllers corresponding to head controllers 36, 38, 40 and 42 have fixed delays, which could be changed only by modifying the number decoding circuitry associated with the three stage counter in each of the head controller circuits.

Form depth board 44 includes four identical delay circuits 46, 48, 50 and 52 which provide the necessary delay in the successive CTOF pulses to account for the 2½ inch representative stagger between the ink jet nozzles. Delay circuits 46–52 may comprise any well-known count-down counter circuits which are responsive to the CP pulse and which are settable to a count representative of the nozzle stagger. However, a preferred embodiment of a delay circuit is described below with respect to FIG. 6. It is preferable, however, that count-down circuits 34–40 be adjustable such that variations in the staggering between the nozzles could be easily accommodated.

As illustrated in FIG. 4, the CTOF pulse from top of form controller 10 is input to delay circuit 46 and also to head controller 34. The CTOF 2, CTOF 3, CTOF 4 and CTOF 5 pulses, which are output respectively input to head controllers 36, 38, 40 and 42. The STR 1 and STR 2 pulses from each of the head controllers is input to common interface nozzle controller circuitry 22–30 as in FIG. 2.

Figure 5:
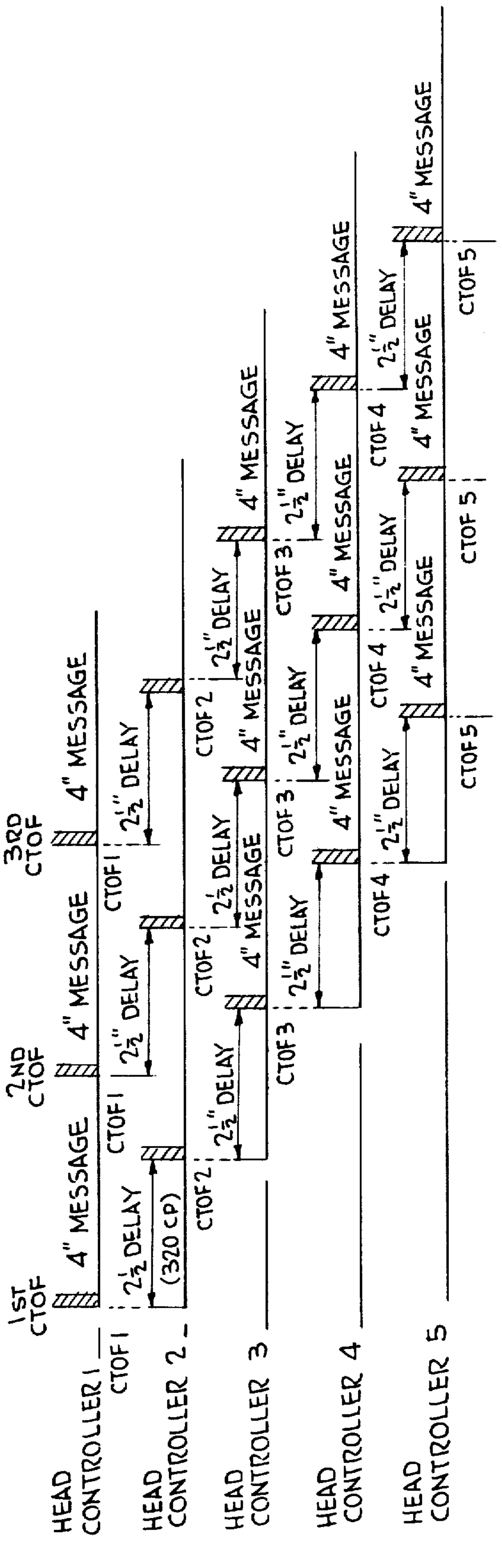
FIG. 5 is a timing diagram showing the relationship between the timing signals generated by the circuitry of FIG. 4.

The timing for a minimum form length is illustrated in FIG. 5. From a comparison of the timing illustrated in FIG. 5 with that illustrated in FIG. 3, it is readily apparent that the present system achieves a reduction in the minimum form length from the 6½ inches of the prior system to substantially 4 inches with the improved system of the present invention. A comparison of the two timing charts also indicates the advantage of the present system over the former system in enabling the CTOF pulses (corresponding to the ASTR 1 pulse of the former system) to be generated during the printing of a message.

Figure 6:
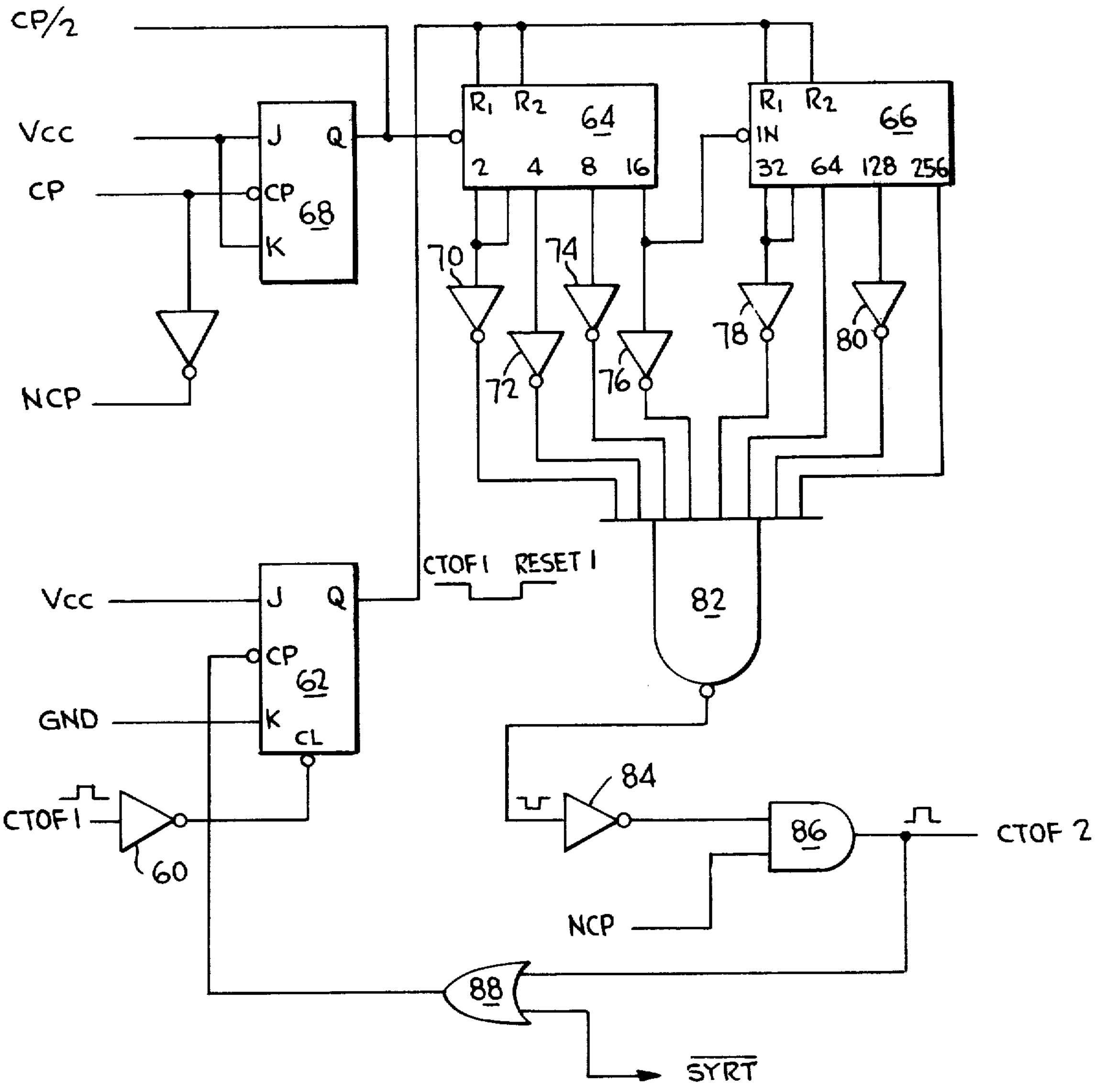
FIG. 6 is a schematic diagram of a typical delay circuit in the form depth board illustrated in FIG. 4 in accordance with the present invention.

An embodiment of the delay circuit in accordance with the invention is illustrated in FIG. 6, which shows the circuitry necessary for the generation of the CTOF 2 pulse for purposes of the present description, and is also representative of the manner in which the CTOF 3

, CTOF 4 and CTOF 5 pulses are generated. As is illustrated in FIG. 4, CTOF 1 pulse from form depth board 44 is identical to the CTOF pulse from top of form controller 10. CTOF 1 is inverted by inverter 60 and is provided to the clear input of flip-flop 62, the Q output of which resets counters 64 and 66. Flip-flop 68 is toggled to divide clock pulses CP to produce clock pulses CP/2 at the Q output thereof. Clock pulses CP/2 are input to counter 64. As is illustrated in FIG. 6, counter 64 is serially connected to counter 68 and by counting CP/2 instead of CP pulses, only two counter stages are required, rather than the three counter stages that would be necessary if CP pulses were counted as is done in the system of the patent. Counters 64 and 66 count the CP/2 pulses until an equivalent count of 320 CP pulses is obtained, which represents a 2½ inches nozzle stagger. (In the improved system of the invention, 128 pulses/in are used rather than 120 pulses/in as in the system of the patent.) At that count the binary 64 and 256 output of counter 66 are positive while all the other stages are negative. Inverters 70, 72, 74, 76, 78 and 80 invert the binary outputs 2, 4, 8, 16, 32 and 128, respectively, of counters 64 and 66. Thus, when a CP count of 320 is reached, the inputs to NAND gate 82 are all positive, and at the count of 320 the output of NAND gate 82 is driven negative, inverted by inverter 84, and the positive output thereof is provided as one input to AND gate 86. The output and AND gate 86 is CTOF 2. Signal NCP is the inverted CP clock pulse train and that signal is positive at the count of 320. When signal NCP goes negative, one clock pulse time later, the output Q of flip-flop 62 is high, which clears counter 64 and 66 and inhibits further counting. Flip-flop 62 is switched by the signal output form OR gate 88, the inputs of which are the output of AND gate 86 and the signal $\overline{SYRT}$ (a computer initialization signal difined in the patent).

Counters 64 and 66 remain inactive until the next CTOF 1 pulse, which starts the aforedescribed process again. CTOF 2 then clears flip-flop (corresponding to flip-flop 62) in the circuitry for generating pulse CTOF 3 in a manner as described above with respect to the generation of pulse CTOF 2. The generation of CTOF 4 and CTOF 5 is identical to that described above with CTOF 2 and therefore pulses CTOF 3, 4 and 5 will be spaced apart by a time interval equivalent to 320 CP pulses.

What is claimed is:

1. A printing system wherein variable alpha/numeric data is printed by a plurality of ink jets in registered and aligned relationship with fixed data printed on a moving web;

means for generating a first time dependent signal representative of the position of said alpha/numeric data to be printed on said web;

delay means responsive to said first time dependent signal for producing a plurality of successive second time dependent signals each being separated by a time interval;

a plurality of controller means each responsive to a respective one of said secondary time dependent signals for independently generating print control signals and wherein at least one of said means is responsive to said first time dependant signal; and means responsive to said plurality of print signals for controlling the plurality of ink jets onto the moving web.

2. A printing system as in claim 1 wherein said plurality of controller means each includes variable delay means for independently varying said print control signals whereby the initial displacements of the plurality of ink jets is varied.

3. A printing system as in claim 1 wherein said delay means includes a plurality of delay circuits each generating one of said plurality of successive second time dependent signals.

4. A printing system as in claim 3 further comprising means for generating pulses depending on the speed of the moving web and wherein said delay circuits include means for dividing said pulses, said means for generating a first time dependent signal is responsive to said pulses, means responsive to a respective one of said plurality of successive second time dependent signals, and means for counting the divided clock pulses to generate that second time dependent signal which is immediately subsequent to said respective one of said plurality of successive second time dependent signals.

5. A printing system as in claim 4 wherein said means for counting includes a first counter interconnected serially with a second counter, number decoding means for responsive to the output of said first and second counters, and logic means responsive to said number decoding means to generate said second time dependent signals.

6. A printing system as in claim 1 further comprising means for generating pulses depending on the speed of the moving web and wherein said means for generating a first time dependent signal is responsive to said pulses.

7. A printing system as in claim 6 further comprising means for dividing said pulses by two.

8. A printing system as in claim 7 wherein said means for generating pulses generates 128 pulses/in. of web movement.

* * * * *